United States Patent
Boardman et al.

(10) Patent No.: US 9,285,190 B1
(45) Date of Patent: Mar. 15, 2016

(54) CORRELATION/ESTIMATION REPORTING ENGAGEMENT SYSTEM AND METHOD

(71) Applicant: Lockheed Martin Corporation, Bethesda, MD (US)

(72) Inventors: Jonathan A. Boardman, Mount Laurel, NJ (US); Jeffrey B. Boka, Lumberton, NJ (US); Naresh R. Patel, Mullica Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/026,661

(22) Filed: Sep. 13, 2013

Related U.S. Application Data (60) Provisional application No. 61/793,014, filed on Mar. 15, 2013.

(51) Int. Cl.
*F41G 7/22* (2006.01)
*F41G 7/00* (2006.01)

(52) U.S. Cl.
CPC *F41G 7/008* (2013.01); *F41G 7/22* (2013.01); *F41G 7/2246* (2013.01); *F41G 7/2253* (2013.01); *F41G 7/2286* (2013.01); *F41G 7/2293* (2013.01)

(58) Field of Classification Search
CPC .......... F41G 7/008; F41G 7/20; F41G 7/22; F41G 7/2246; F41G 7/2253; F41G 7/2273; F41G 7/2286; F41G 7/2293; G01S 13/86; G01S 13/867

USPC ......... 250/336.1, 338.1, 339.01, 339.02, 340, 250/342; 244/3.1, 3.15–3.19; 342/52–55, 342/61–66, 73–82, 89, 90, 118, 145, 175, 342/189, 195, 159, 165, 173, 174; 382/100, 382/103; 89/1.11; 398/140, 151–153
See application file for complete search history.

(56) References Cited

U.S. PATENT DOCUMENTS

| | | | | |
|---|---|---|---|---|
| 3,150,363 | A * | 9/1964 | Finvold | 398/151 |
| 4,817,495 | A * | 4/1989 | Drobot | 89/1.11 |
| 6,196,496 | B1 * | 3/2001 | Moskovitz et al. | 244/3.15 |
| 6,672,534 | B2 * | 1/2004 | Harding et al. | 244/3.15 |
| 6,809,682 | B1 * | 10/2004 | Madewell | 342/159 |
| 6,877,691 | B2 * | 4/2005 | DeFlumere et al. | 244/3.16 |
| 7,137,588 | B2 * | 11/2006 | Humphrey | 244/3.15 |
| 7,154,433 | B1 * | 12/2006 | Madewell | 342/159 |
| 7,338,009 | B1 * | 3/2008 | Bobinchak et al. | 244/3.15 |

(Continued)

OTHER PUBLICATIONS

U.S. Appl. No. 13/803,907, filed Mar. 14, 2013 entitled "Passive Range Estimating Engagement System and Method" by Boardman, et al.

*Primary Examiner* — Bernarr Gregory
(74) *Attorney, Agent, or Firm* — Howard IP Law Group, PC (57) ABSTRACT

A system and method for performing correlation processing for identifying an object of interest in a cloud of remote objects of different types comprises receiving RF and IR measurement data including rotational, translational bias and noise errors and determining and removing biases by minimizing a weighted distance metric. Correlation pairing metrics are then determined according to a maximum likelihood criteria. This method produces a correlation solution that minimizes the effects of biases and random noise while accounting for the statistical properties of the parameters being estimated.

17 Claims, 8 Drawing Sheets

(56) References Cited

U.S. PATENT DOCUMENTS

| | | | |
|---|---|---|---|
| 7,348,918 B2 * | 3/2008 | Redano | 342/62 |
| 7,422,175 B1 * | 9/2008 | Bobinchak et al. | 244/3.15 |
| 7,675,012 B1 * | 3/2010 | Bobinchak et al. | 244/3.15 |
| 8,115,148 B1 * | 2/2012 | Boardman et al. | 244/3.14 |
| 8,134,492 B1 | 3/2012 | Friesel | |
| 8,253,621 B1 | 8/2012 | Friesel | |
| 8,378,880 B1 | 2/2013 | Boka et al. | |
| 8,427,364 B1 | 4/2013 | Friesel | |
| 8,674,276 B2 * | 3/2014 | Rovinsky | 244/3.15 |

\* cited by examiner

| | | IR OBJECTS | | | |
|---|---|---|---|---|---|
| | MLH | 1 | 2 | 3 | 4 |
| RF OBJECTS | 1 | P(1,1) | P(1,2) | P(1,3) | P(1,4) |
| | 2 | P(2,1) | P(2,2) | P(2,3) | P(2,4) |
| | 3 | P(3,1) | P(3,2) | P(3,3) | P(3,4) |

Correlation Matrix

FIG. 8

CORRELATION/ESTIMATION REPORTING ENGAGEMENT SYSTEM AND METHOD

CROSS-REFERENCE TO RELATED APPLICATIONS

The present application claims priority to U.S. Provisional Patent Application No. 61/793,014 filed Mar. 15, 2013 and entitled "Correlation/Estimation Reporting Engagement System and Method", the entire disclosure of which is hereby incorporated by reference herein.

FIELD OF THE INVENTION

The disclosed system and method relate to missile tracking More specifically, the disclosed system and method relate to tracking and intercept of a ballistic missile (BM).

BACKGROUND OF THE INVENTION

In the engagement and intercept of a hostile ballistic missile (BM), a weapon system will typically track the ballistic missile objects using a ground-based radio frequency (RF) sensor and transmit track information to an intercepting missile for processing. The intercepting missile is typically equipped with an infrared (IR) sensor which is used to acquire and track the hostile ballistic missile objects as part of the engagement sequence.

Hostile ballistic missiles, however, can be expected to deploy decoy objects to conceal the warhead(s) and avoid tracking and interception. Multiple objects from one or more BM launch events may therefore be present in the IR sensor field of view (FOV). In order to select and guide to the targeted object, a correlation process takes place in order to relate the RF track information to the IR track information. The information from the RF sensor may contain object states as well as identifying properties or features for each object. Processors on board the interceptor missile take this information and relate it with its own measurements and processing to match the RF tracks on each object with the IR tracks and determine the object of interest for the engagement. The accuracy of this correlation process is extremely important to the success of the intercept. The determination of the object of interest will drive missile guidance algorithms to complete the intercept. However, uncertainties in both the RF and IR tracks can lead to poor correlation and degraded intercept performance.

A correlation process may produce inaccurate results due to a number of reasons. For example, information from each sensor may be corrupted by errors including random noise and translational and rotational biases. Measurement noise and systematic errors thus need to be minimized in order to properly correlate, track and intercept the target of interest. A correlation system and method should choose an optimal solution by modeling and solving for the object states and deterministic errors and accounting for the uncertainty and error distribution associated with each quantity. However, current implementations of correlation processes are based on ad hoc methods that may differ widely depending on the scenario and do not properly account for the deterministic biases associated with RF and IR measurements and the statistical properties of the estimated parameters.

Alternative systems and methods are desired.

SUMMARY OF THE INVENTION

An aspect of the present disclosure provides for enhanced correlation of pairs of RF sensed objects and IR sensed objects within a cloud of objects, wherein the correlation data is used to select a preferred object within the cloud of objects of lesser interest and guide the missile to intercept based on the correlation data.

In one embodiment, a correlation process comprises determining and removing biases by minimizing a weighted distance metric. Correlation pairing metrics are then determined according to a maximum likelihood criteria. This method produces a correlation solution that minimizes the effects of biases and random noise while accounting for the statistical properties of the parameters being estimated. The correlation solution takes the form of a correlation matrix containing the probabilities of correlation between each RF and IR object, which is passed to an object selection module. This logic determines the object of interest, or the guide-to object based on the correlation data and is used to drive missile guidance algorithms and complete the intercept.

By accounting for biases prevalent in sensor measurements and determining an optimal solution based on statistical properties of the parameters being estimated, the system and method of the present invention provides for increased correlation accuracy and more accurate selection of the preferred object, thereby yielding overall increased intercept performance.

BRIEF DESCRIPTION OF THE DRAWINGS

The details of the invention, both as to its structure and operation, may be obtained by a review of the accompanying drawings, in which like reference numerals refer to like parts, and in which.

DETAILED DESCRIPTION

It is to be understood that the figures and descriptions of the present invention have been simplified to illustrate elements that are relevant for a clear understanding of the present invention, while eliminating, for purposes of clarity, many other elements found in radar detection, tracking and engagement systems that employ RF and IR sensors. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Although the system of the disclosure is described in the context of a missile weapon system, it should be noted that the methodology could be used in other applications where correlation of information from different sources is needed, and where bias estimation and error compensation resulting from sensed random noise and translational and rotational biases arise, and/or where multiple probabilities from varying sensors or sources need to be combined in an "optimal" sense, factoring in the confidence levels of each source or sensor.

As shown and described herein, a correlation estimation and reporting method for selecting an object of interest in a cloud of objects of lesser interest comprises: obtaining positional data from RF and IR sensors; processing the positional data to generate a dimensional representation in a common reference frame; combining the RF and IR measurements to determine translational bias and angular misalignment errors associated with the RF and IR measurements; defining a weighted distance metric based on sensor measurement uncertainties; determining bias estimates based on the distance metric; and determining correlation components for each combination of RF and IR objects using the determined bias estimates for generating RF/IR correlation matrix data for input to an object selection process.

Figure 1:
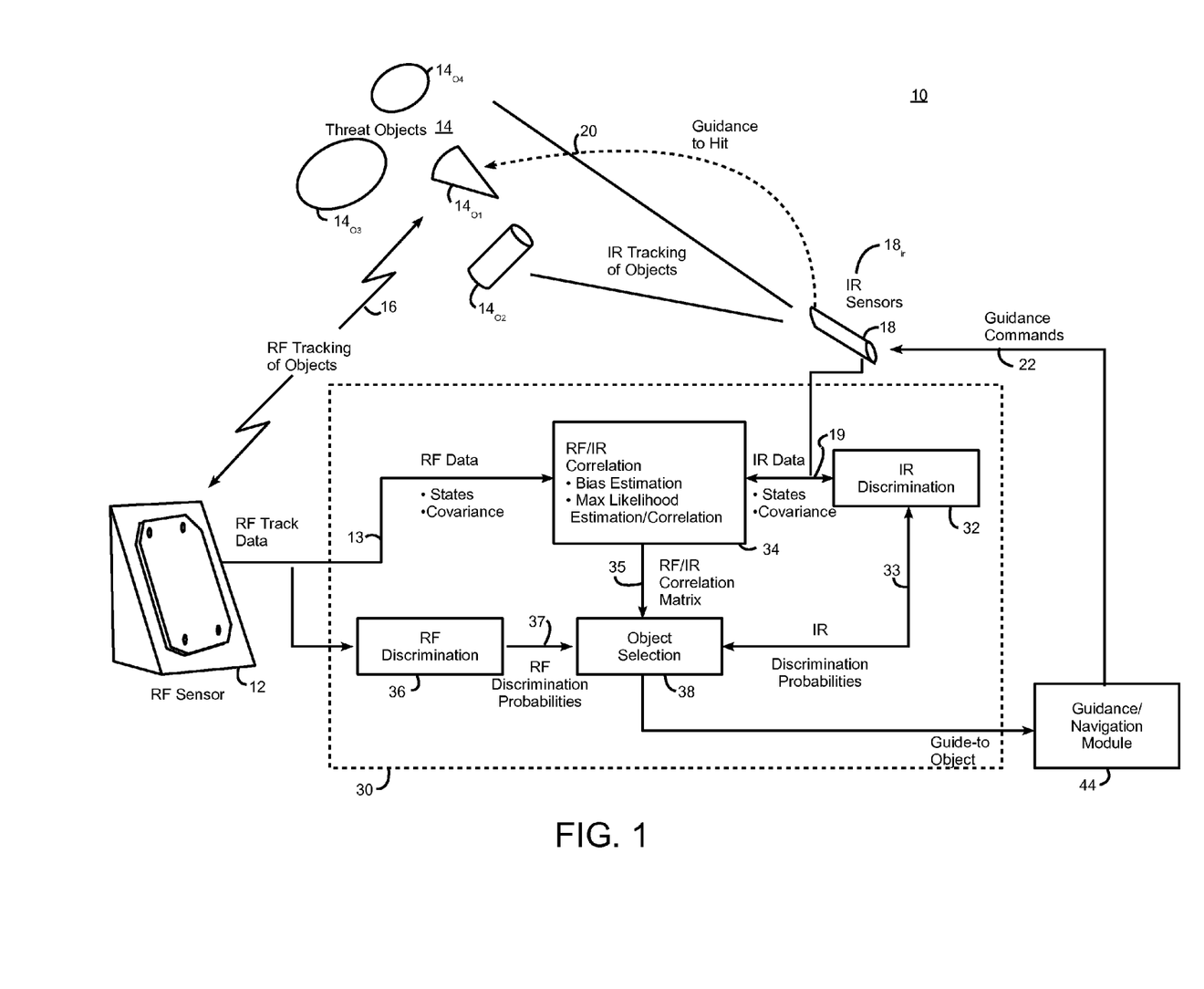
FIG. 1 is a simplified block diagram illustrating a system including an object sensing and discrimination arrangement including an RF/IR correlator with bias estimation and maximum likelihood determination for providing a threat engagement according to an aspect of the disclosure.
Figure 3:
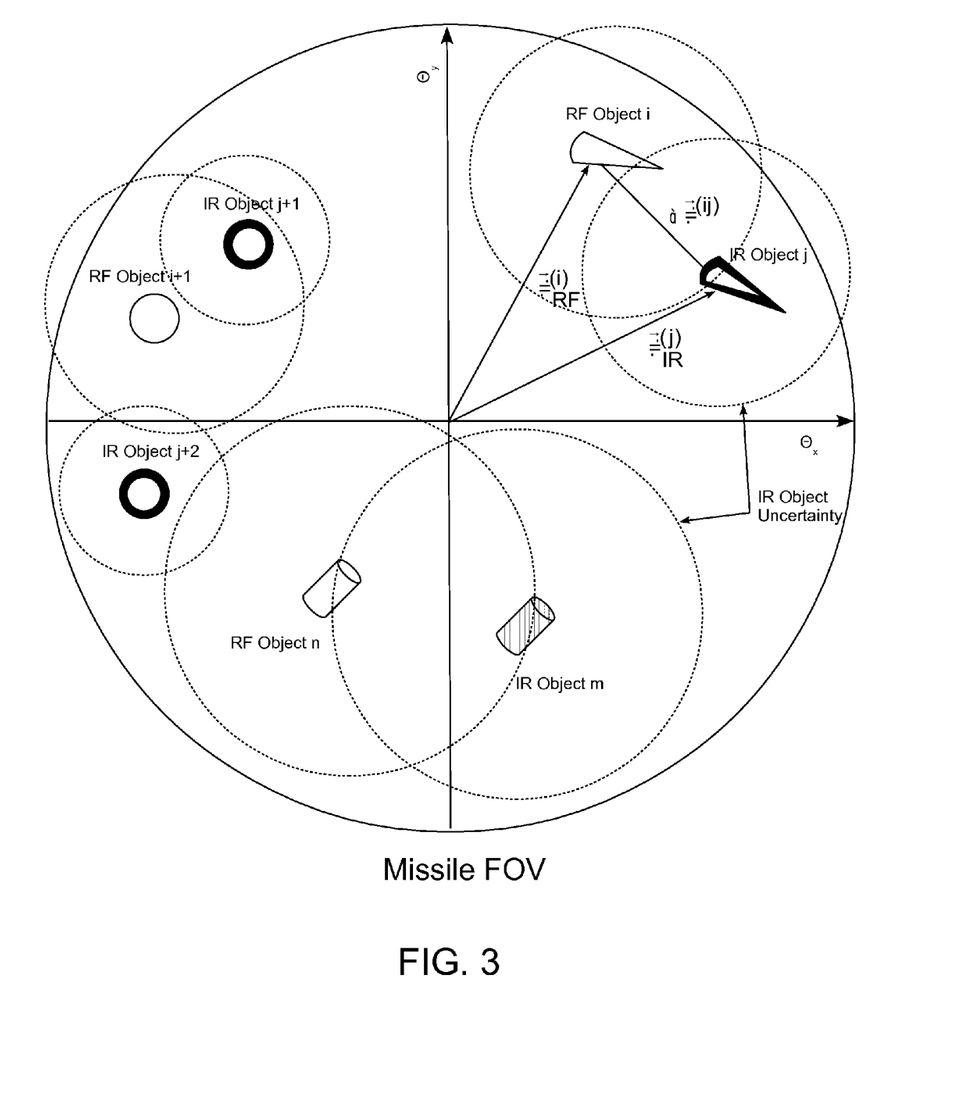
FIG. 3 is a notional representation of ballistic objects to be discriminated in a nominal IR scenario where there may be inconsistencies in object states from the RF sensor compared to the IR measurements.

In FIG. 1, a scenario 10 includes a radio-frequency sensor 12 such as a radar system, which tracks a cloud 14 of objects $14_{O1}$, $14_{O2}$, $14_{O3}$, and $14_{O4}$ by means of one or more radio-frequency (RF) radar beams, illustrated by a "lightning bolt" symbol 16. Sensor 12 may be on the Earth's surface (land or sea) rather than airborne. The cloud 14 may originate from a hostile missile, one portion of which, after deployment, may be manifested as object $14_{O1}$. The radar sensor system 12 produces RF track data, which is made available to an object selection and discrimination system designated generally as 30 and which includes an RF discrimination system designated generally as 36 and an RF/IR correlation system designated generally as 34. Object $14_{O1}$ of cloud 14 of FIG. 1 is illustrated as a conical object, suggesting that it is the reentry device against which action is to be taken; details of the cloud or set 14 are illustrated in FIG. 3. Also in FIG. 1, an anti-missile missile or interceptor missile 18 is illustrated as being guided along a guidance track 20 by guidance commands transmitted over a path 22 from a guidance/navigation module illustrated as a block 44. Interceptor missile 18 is fitted with an optical or infrared sensor $18ir$, which generates infrared tracking data relating to those objects of cloud 14 within its field of view. The infrared tracking data is applied by way of a path 19 to an IR discriminator illustrated as a block 32 and to RF/IR correlation block 34 of object sensing and discrimination system 30. RF/IR correlation block 34 also receives RF track data including state and covariance data from RF sensor 12 by way of a path 13. Object selection and discrimination system 30 of FIG. 1 also includes an RF discrimination function illustrated as a block 36, which receives RF track data by way of path 13. A probabilistic object selection function illustrated as block 38 receives discriminated infrared information from block 32 by way of a path 33, discriminated RF information from block 36 by way of a path 37, and RF/IR correlation information from block 34 by way of a path 35. The threat objects of set 14 deployed from the hostile missile are tracked by both RF sensor 12 and IR sensor $18ir$.

According to an aspect of the disclosure, two dimensional IR target states and covariance data from IR sensor $18ir$ along with RF target states and covariance data from RF sensor 12 are input to RF/IR correlation module 34. As will be discussed herein, the RF/IR correlator 34 performs bias estimation and maximum likelihood determination calculations to provide enhanced correlation information in the form of RF/IR correlation matrix data to allow for increased probability of correct object selection and guide-to-object navigation (in this case, the guide-to object is conical element $14o1$). The interceptor missile is guided toward the selected object for the purpose of hitting and killing it using the kinetic energy of the collision, or at least bringing the interceptor missile within a range in which an explosive charge can be effectively used.

Figure 5:
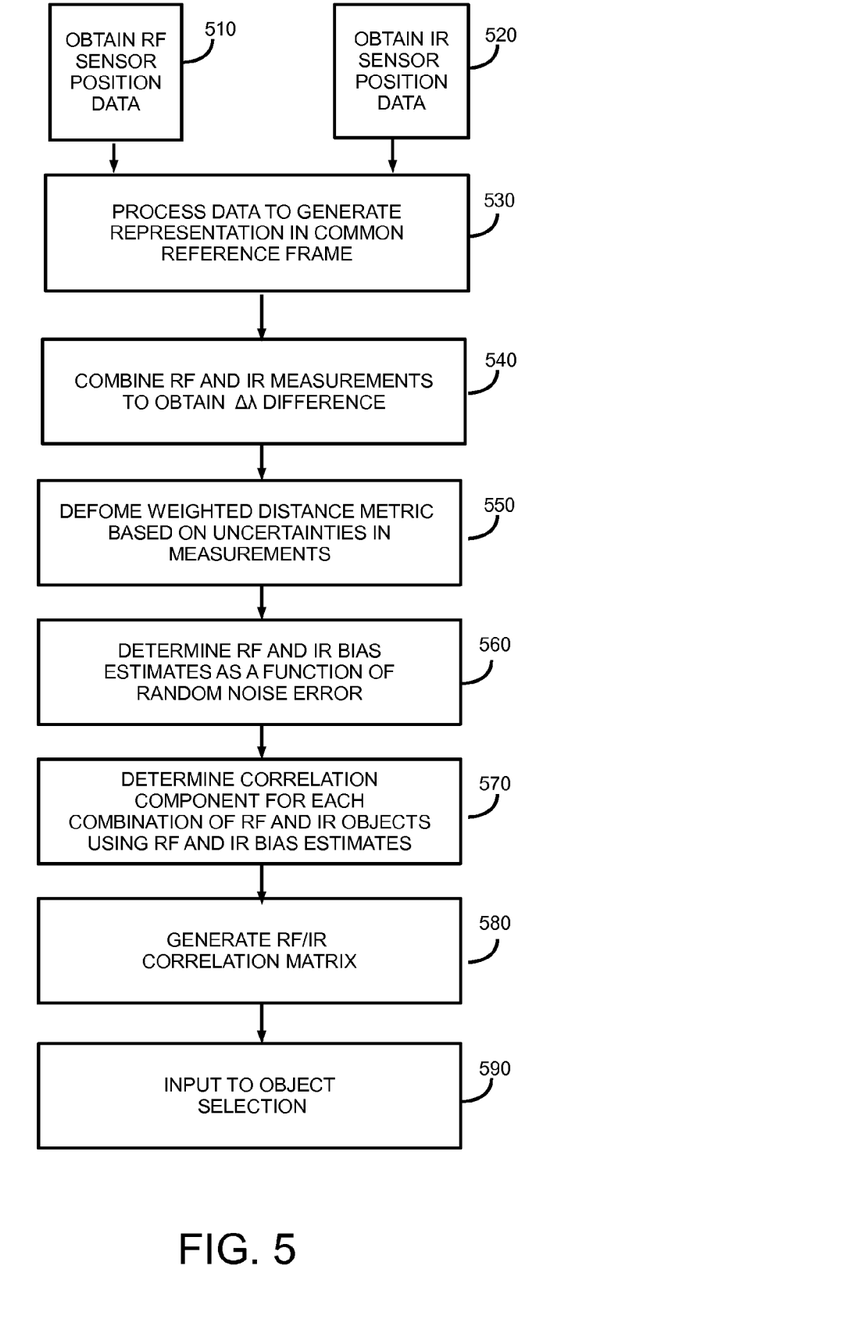
FIG. 5 is a process flow showing bias estimation and RF/IR correlation using distance metrics for object selection and target intercept according to an aspect of the disclosure.

Referring now to the flow chart of FIG. 5, in conjunction with the system illustration shown in FIG. 1, selecting an object of interest in a cloud of objects of lesser interest may be accomplished through RF/IR correlation module 34 (FIG. 1) receiving positional data (block 510 of FIG. 5) from RF sensor 12 and IR sensor $18ir$ (block 52). The RF and IR data is processed (block 530) to generate a dimensional representation in a common reference frame (e.g. LOS). The RF and IR measurements are combined (block 540) to determine translational bias and angular misalignment errors associated with the RF and IR measurements. A weighted distance metric is defined (block 550) based on sensor measurement uncertainties and RF and IR bias estimates are determined (block 560) based on the distance metric. Correlation components for each combination of RF and IR objects are then determined (block 570) using the determined bias estimates for generating RF/IR correlation matrix data (block 580) for input to an object selection process (block 590).

As shown in FIG. 1, the deployed threat and decoy objects of set 14 are tracked by both RF and IR sensors. The same object may not be tracked by each sensor, and also the number of objects may not be equal in the Field of View (FOV) of each tracking sensor. The lack of exact correspondence between the number of objects tracked by the RF and optical sensors may be attributable, in part, to the time required for the RF sensor to scan over its field-of-view, including the cloud, and to the limited and continually-changing field of view of the optical sensor. The discrimination function and algorithm represented by selection and engagement system 30 computes the tracked object discrimination probability using tracking data from the various sensors. The system uses the outputs of the IR and RF discrimination algorithms of blocks 32 and 36 to identify the object types of the RF and IR tracked objects. The RF and IR discrimination processing blocks 32, 36 as well as the object selection processing block 38 may be implemented according to known methods, such as by way of non-limiting example, the processing described in U.S. Pat. No. 8,378,880 issued Feb. 19, 2013 in the name of Boka et al., and assigned to the assignee of interest herein, the subject matter thereof incorporate herein by reference in its entirety.

It should be noted that the various processing blocks of FIG. 1 may be located at the site of RF sensor 12, at the interceptor missile 18, or at some other location, the only requirement being that the communication delays be sufficiently short to allow proper operation. Those skilled in the art will appreciate that embodiments of the invention may be practiced with various computer system configurations, including multi-processor systems, microprocessor-based or programmable electronic devices, network PCs, minicomputers, mainframe computers and the like. The invention may be practiced in distributed computing environments where tasks are performed by remote processing devices that are linked through a communications network as discussed herein. In a distributed computing environment, program modules may be located in local and remote memory storage devices. Suitable computer program code may be provided for performing the functions described herein such as RF discrimination, IR discrimination, RF/IR correlation, probabilistic object selection and engagement, guidance and navigation, and other calculations illustrative of the type of functions which may be performed by computer program code embodiments of the present invention.

By way of non-limiting example only, interceptor missile 18 may include the functionality associated with processing blocks 32 (IR discrimination), 34 (RF/IR correlation), 38 (object selection) and 44 (guidance/navigation) with communication paths 19, 22, 33, and 35 being typical electrical (including optical) communications media for communicating information within interceptor missile 18. RF data from the RF sensor 12 (including RF probability data from RF discriminator 36) located remotely from interceptor missile 18 may be communicated to interceptor missile 18 via one or more radio links (e.g. paths 13, 37).

It is further understood that processing modules 32, 34, 36, 38, 44 may be implemented using one or more corresponding computer processors (e.g. CPU) and associated data storage devices (e.g. memory). The data storage device(s) may store, for example, (i) a program (e.g., computer program code and/or a computer program product) adapted to or configured to direct the processor in accordance with embodiments of the present invention, and (ii) a database adapted to store information that may be utilized to store information required by the program. The program may be stored, for example, in a compressed, an uncompiled and/or an encrypted format, and may include computer program code. The instructions of the program may be read into a main memory of the processor from a non-transitory computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of embodiments of the present invention. Thus, embodiments of the present invention are not limited to any specific combination of hardware and software. The computer program code required to implement the functions described herein can be developed by a person of ordinary skill in the art, and is not described in detail herein. The term "computer-readable medium" as used herein refers to any medium that provides or participates in providing instructions to the processor of the computing device (or any other processor of a device described herein) for execution. Such a medium may take many forms, including but not limited to, non-volatile media, non-transitory media, tangible media, volatile media, and transmission media. Non-volatile media and tangible media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, other memory chip or cartridge, a carrier wave, or other medium from which a computer can read.

As discussed herein, IR track data (2D target states and covariance data) and RF track data (3D target states and covariance data) is applied to RF/IR module 34. The result of the RF/IR correlation algorithm in block 34 is an M×N RF/IR correlation matrix (where M denotes the number of RF objects being tracked and N denotes the number of IR objects being tracked). The M×N RF/IR correlation matrix represents the confidence or probability that the $i^{th}$ RF object is correlated or matched with the $j^{th}$ IR object. The M×N RF/IR correlation matrix is applied from RF/IR correlation block 34 to RF Confusion matrix from block 36 by way of a path 35. The correlation in block 34 can be performed using the methodology as described herein for RF and IR sensor data, for each tracked object of each sensor, and may be based on obtaining positional data from each of the RF and IR sensors, processing the data to generate a dimensional representation in a common reference frame; combining the RF and IR measurements to determine translational bias and angular misalignment errors associated with the RF and IR measurements; defining a weighted distance metric based on sensor measurement uncertainties; determining bias estimates based on the distance metric; and determining correlation components for each combination of RF and IR objects using the determined bias estimates for generating RF/IR correlation matrix data for input to the object selection process.

Figure 2:
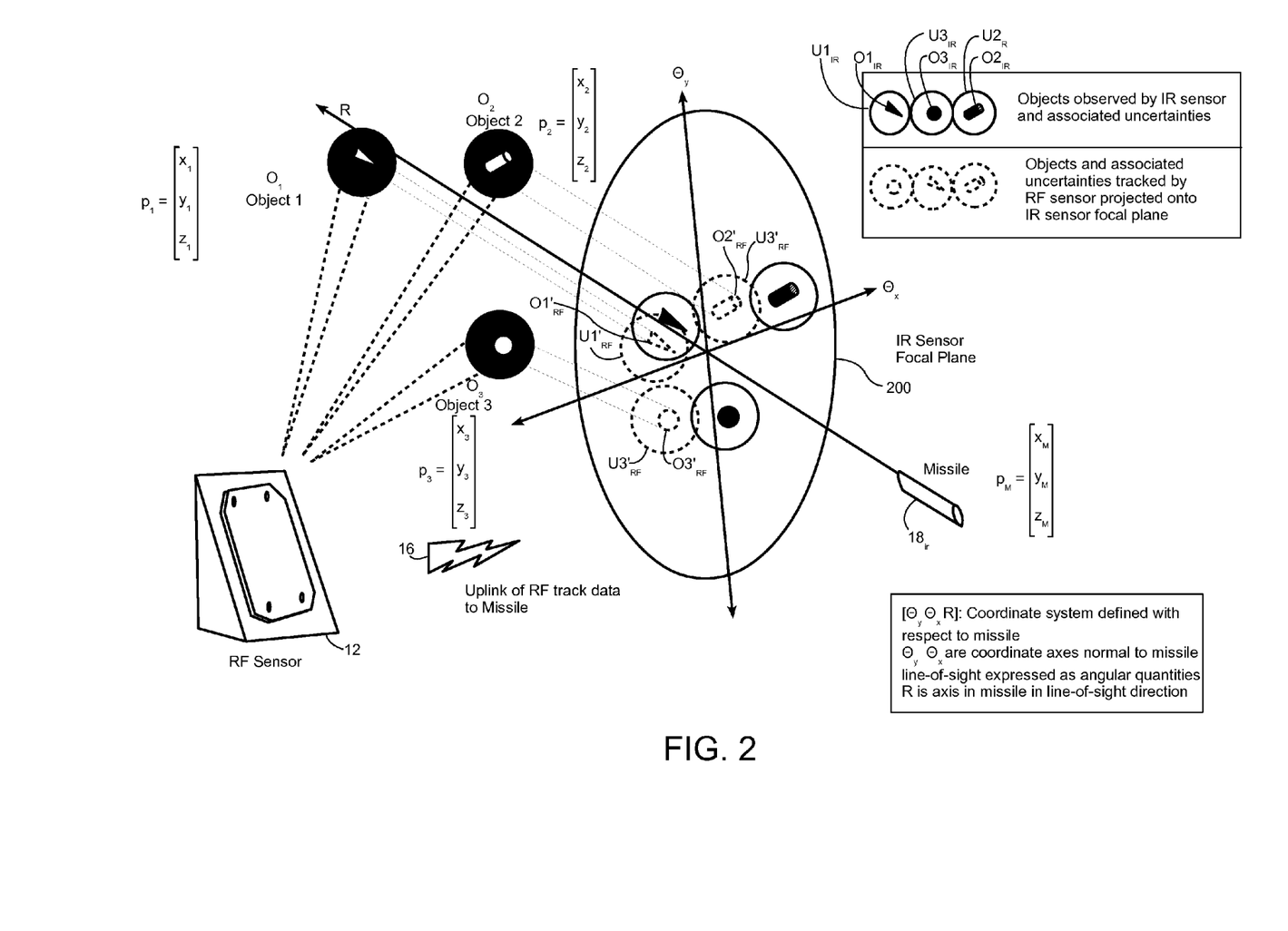
FIG. 2 is a representation of a portion of the system geometry showing ground-based RF sensor track data and IR sensor data and associated uncertainties in a coordinate system defined relative to the intercepting missile IR sensor.

Referring now to FIG. 2, in conjunction with the processing architecture shown and described with regards to FIG. 1, in a typical BM engagement, a ground-based RF sensor 12 will track and uplink (16) the 3-dimensional position and velocity of any number of BM objects (e.g. O1, O2, O3) to the intercepting missile. Position vector information associated with each of the objects O1, O2, O3 are illustrated as p1, p2 and p3, respectively, relative to a given coordinate system. Interceptor missile 18 (with IR sensor) position $p_M$ is also obtained from the sensor data. A second coordinate system is defined with respect to the interceptor missile and given as [Θy, Θx, R]. The axes indicated as Θy, Θx are coordinate axes normal to the missile line of sight expressed as angular quantities with R as the axis in the missile line of sight direction. In an exemplary embodiment, processing onboard the missile will generate the projected RF states shown in dashed lines as (O1'$_{RF}$, O2'$_{RF}$, O3'$_{RF}$) for each object projected within the IR sensor focal plane 200 along with their associated uncertainties (U1'$_{RF}$, U2'$_{RF}$, U3'$_{RF}$). These projected states are then compared with the object states estimated and shown in solid lines as (O1$_{IR}$, O2$_{IR}$, O3$_{IR}$) along with their associated uncertainties (U1$_{IR}$, U2$_{IR}$, U3$_{IR}$) using the onboard IR sensor 18$ir$. Correlation processing will attempt to consolidate these two sets of states. As can be seen from the illustration, depending on the intercept geometry, the objects may be separated by significant distances relative to their uncertainties in 3-dimensional space, but when projected onto the IR sensor focal plane, they may appear very close together, with some object areas of uncertainties overlapping.

FIG. 3 shows an example of an IR scenario where the RF and IR objects are projected into the 2D IR sensor focal plane. As shown, a correlation process will typically use an angular distance metric $\Delta\vec{\lambda}$ derived from the RF and IR object states within the sensor focal plane $\vec{\lambda}_{RF}$ and $\vec{\lambda}_{IR}$. When object states from the RF sensor are compared to IR measurements, inconsistencies and uncertainties as shown therein may result and such errors modeled and resolved. Note that with respect to FIG. 3, RF object i represents a threat object, as does IR object j. the remaining objects represent various types of decoy objects, as is understood by one of ordinary skill in the art.

Figure 6:
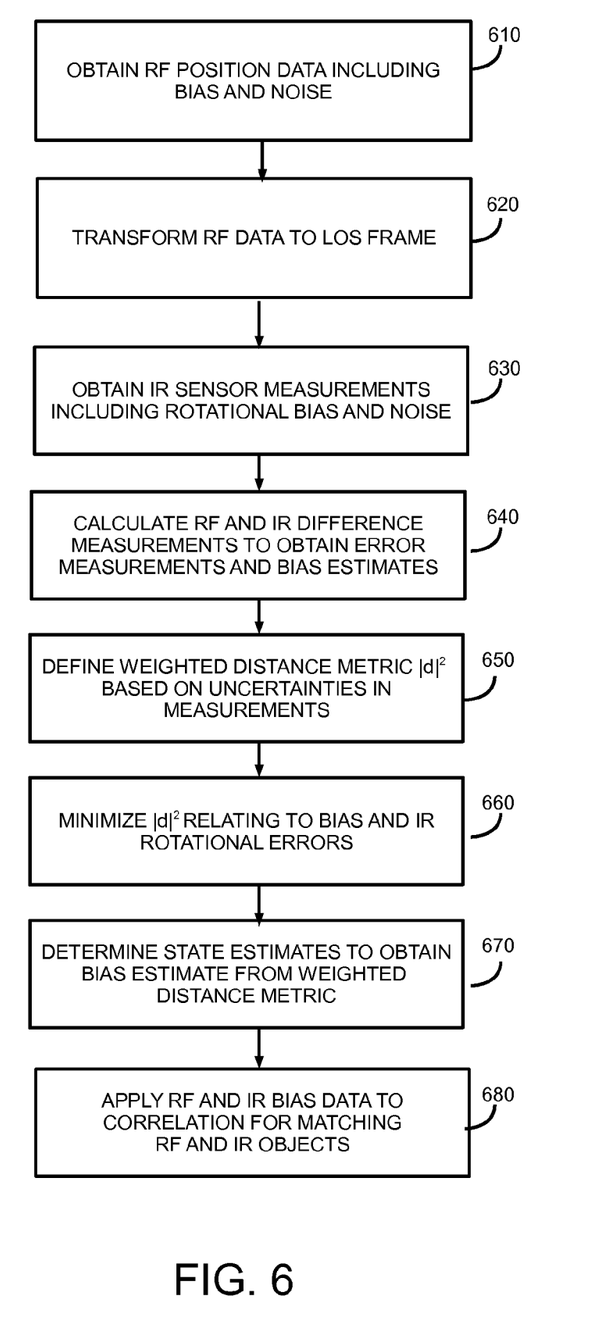
FIG. 6 is a more detailed process flow showing bias estimation calculations for determining state results using a weighted distance metric according to an aspect of the disclosure.

According to an aspect of the disclosure, and with reference to the process flow of FIG. 6 and the diagram of FIG. 3, the position measurement from the RF sensor for one object can be obtained (block 610) and expressed as:

$$\vec{x}_{RF}=(I+[\Delta\tilde{\theta}])\vec{x}_T+\vec{\beta}+\vec{\eta} \qquad \text{eq. 1}$$

where $\vec{x}_T$ represents the truth object position in the RF sensor's own coordinate frame (e.g. ENU frame), and $[[\Delta\tilde{\theta}]]$ matrix represents a rotational misalignment (rotational bias) of the radar. The radar's translational bias is represented as $\vec{\beta}$ while $\vec{\eta}$ represents the radar measurement noise. As shown in block 620, the RF measurement may be represented in the IR sensor's line of sight (LOS) frame and results in $$\vec{\lambda}_{RF}=A_p T_{ENU}^{LOS}\vec{x}_{RF}=\vec{\lambda}_T+\vec{\beta}+\vec{\eta}+\Delta\vec{\lambda}_\theta \qquad \text{eq. 2}$$

Where $T_{ENU}^{LOS}$ is the transformation from the RF sensor's ENU frame to the IR sensor's LOS frame, and $A_p$ is a projection matrix, projecting the 3D RF measurements onto the 2D IR sensor's plane. The bias $\vec{\beta}$ and noise $\vec{\eta}$ may now be expressed in the LOS frame and $\Delta\vec{\lambda}_\theta$ represents the error due to a rotational misalignment of the radar. The truth position projected into the LOS frame is given as $\lambda_T$. The translational and rotational biases from the radar can be combined since they represent essentially nuisance parameters and their actual values are insignificant $\vec{\beta}'=\vec{\beta}+\Delta\vec{\lambda}_\theta$. After combining the biases, $\vec{\beta}'$ is now referred to as $\vec{\beta}$. The RF measurement in the LOS frame can be expressed as $$\vec{\lambda}_{RF}=\vec{\lambda}_T+\vec{\beta}+\vec{\eta} \qquad \text{eq. 3}$$

The measurement from the IR sensor is determined as $$\vec{\lambda}_{IR}=(1+[\Delta\tilde{\phi}])\vec{\lambda}_T+\vec{\upsilon} \qquad \text{eq. 4}$$

(block 630) where, $[\Delta\tilde{\phi}]$ is a matrix representing rotational misalignment about an axis normal to the IR sensor's field of view (FOV) and $\vec{\upsilon}$ is the IR measurement noise.

Processing continuous by taking the difference between the RF and IR measurements (block 640) which results in a measure of corruption by the RF translational bias and the angular error given as:

$$\Delta\vec{\lambda}=\vec{\lambda}_{RF}-\vec{\lambda}_{IR}=\vec{\beta}+\vec{\eta}-\vec{\Gamma}-\vec{\upsilon} \qquad \text{eq 5}$$

Where, $\vec{\Gamma}[\Delta\vec{\phi}]\vec{\lambda}$ is the error due to the rotational misalignment about the IR sensor's line-of-sight axis. The error associated with a set of measurements $\Delta\vec{\lambda}$ (representing the difference between the RF and IR sensor) and bias estimates $[\hat{\beta}^T\ \hat{\Gamma}^T]^T$ is the measured value minus the estimate $$\vec{\varepsilon}=\Delta\vec{\lambda}-L\begin{bmatrix}\hat{\beta}\\\hat{\Gamma}\end{bmatrix} \qquad \text{eq. 6}$$

Where, $L=[I_{2\times2}-I_{2\times2}]$ and I is an identity matrix.
Processing continues by determining the weighted distance metric (block 650) as $$|d|^2=\vec{\varepsilon}^T W^{-1}\vec{\varepsilon}+\hat{\beta}^T R^{-1}\hat{\beta}+\hat{\Gamma}^T V^{-1}\hat{\Gamma} \qquad \text{eq. 7}$$

which enables the relation of bias estimates to a metric to minimize d. The parameters W, R and V are weight matrices describing the uncertainty in the measurements. They are representative of the measurement noise covariance, radar bias covariance and the IR sensor rotational misalignment covariance, respectively. The solution is obtained by minimizing $|d|^2$ with respect to the radar bias estimate $\hat{\beta}$ and the IR rotational misalignment estimate $\hat{\Gamma}$. This can be determined (block 660) according to the following:

$$\delta|d|^2=\frac{\partial|d|^2}{\partial\vec{\varepsilon}}\delta\vec{\varepsilon}+\frac{\partial|d|^2}{\partial\hat{\beta}}\delta\hat{\beta}+\frac{\partial|d|^2}{\partial\hat{\Gamma}}\delta\hat{\Gamma}=0 \qquad \text{eq. 8}$$

Using $\delta\vec{\varepsilon}=-\delta\vec{\beta}-\delta\Delta\hat{\phi}$, and collecting terms results in $$(\hat{\beta}^T R^{-1}-\vec{\varepsilon}^T W^{-1})\delta\hat{\beta}+(\hat{\Gamma}^T V^{-1}-\vec{\varepsilon}^T W^{-1})\delta\hat{\Gamma}=0 \qquad \text{eq. 9}$$

Since the biases are uncorrelated, in order for the above equation to equal zero, each individual term must equal zero. Setting each term equal to zero and solving for the bias estimates results in $$\begin{bmatrix}\hat{\beta}\\\hat{\Gamma}\end{bmatrix}=\begin{bmatrix}R^T\\V^T\end{bmatrix}W^{-T}\vec{\varepsilon} \qquad \text{eq. 10}$$

In this manner the RF and IR biases may be shown in relation to the random noise errors.

Defining the state $\vec{s}=[\hat{\beta}^T\hat{\Gamma}^T]^T$, and $Q=[R\ V]$, the above equation can be re-written $$\vec{s}=Q^T W^{-T}(\Delta\vec{\lambda}-L\vec{s}) \qquad 11$$

Solving for the state results in the bias estimate (block 670) obtained from the weighted distance metric as $$\vec{s}=(I+Q^T W^{-T}L)^{-1}Q^T W^{-T}\Delta\vec{\lambda} \qquad \text{eq. 12}$$

The determined RF and IR bias data may be applied (block 680) to correlation processing for matching the RF and IR objects, as is understood in the art.

Figure 7:
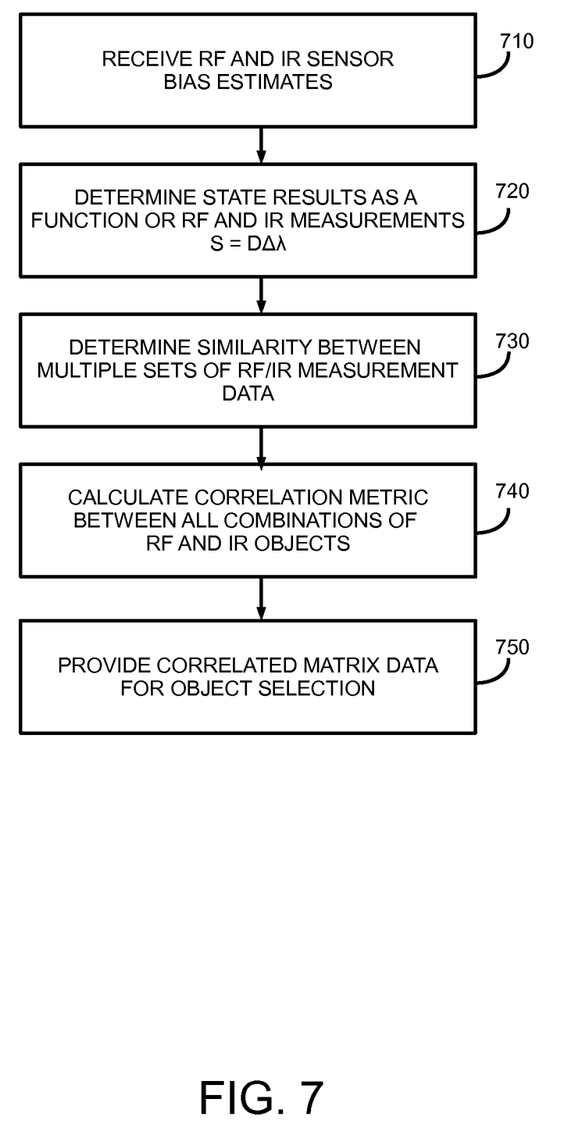
FIG. 7 is a more detailed process flow showing correlation calculations using the determined state results of FIG. 6 for providing an RF/IR correlation matrix according to an aspect of the disclosure.

Referring now to FIG. 7, correlation processing according to an embodiment of the invention will be described for matching the RF and IR objects. The correlation processing of FIG. 7 is initiated (block 710) after the biases from both the RF and IR sensors determined in FIG. 6 are accounted for.

The state can be expressed as a function of the measurement using the above identified bias estimate $\vec{s}=D\Delta\vec{\lambda}$, where $D=(I+Q^T W^{-T}L)^{-1}Q^T W^{-T}$ (block 720). The error can be expressed in a similar manner using eq. 6 and eq. 12 where $\vec{\epsilon} = F\Delta\vec{\lambda}$ and where $F=(I-LD)$. The weighted distance may now be expressed as a function of the measurement and weight matrices.

$$|d|^2 = \Delta\vec{\lambda}^T F^T W^{-1} F \Delta\vec{\lambda} + \Delta\vec{\lambda}^T D^T R_\nu D \Delta\vec{\lambda} \qquad \text{eq. 13}$$

Where, $$R_\nu = \begin{bmatrix} R^{-1} & O_{2\times 2} \\ O_{2\times 2} & V^{-1} \end{bmatrix} \qquad \text{eq. 14}$$

The above may be expressed as $$|d|^2 = \Delta\vec{\lambda}^T C \Delta\vec{\lambda} \qquad \text{eq. 15}$$

Where, $C=F^T W^{-1} F + D^T R_\nu D$. This is known as the Mahalanobis distance and may be used to determine similarity between multiple sets of data (block 730).

Maximum likelihood estimation can also be used maximize the probability of the similarity of two sets of data. This method is considered to be more robust statistically and yields results with good statistical properties.

$$MLH = \frac{1}{(2\pi)^{k/2} |C|^{1/2}} \exp\left(-\frac{1}{2}\Delta\vec{\lambda}^T C \Delta\vec{\lambda}\right) \qquad \text{eq. 16}$$

Figure 8:
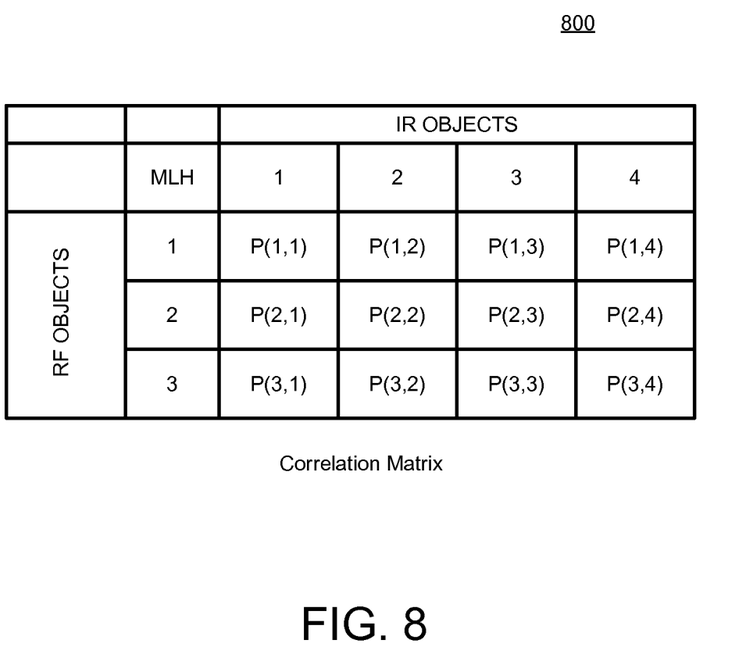
FIG. 8 is a schematic illustration of an RF/IR correlation matrix for object selection and target intercept according to an aspect of the disclosure.

The correlation metric, MLH, is then computed (block 740) between all possible combinations of RF and IR objects to generate a RF/IR correlation matrix (block 750) for object selection and target intercept. An exemplary correlation matrix 800 is shown in FIG. 8 and may be computed using the normalized MLH values between each pair of objects. The matrix entries give the probability of the pairing of each combination.

The output of the RF/IR correlation is provided to objection selection logic for determining the object of interest, or the guide-to object based on the correlation data and is used to drive missile guidance algorithms and complete the intercept.

Figure 4:
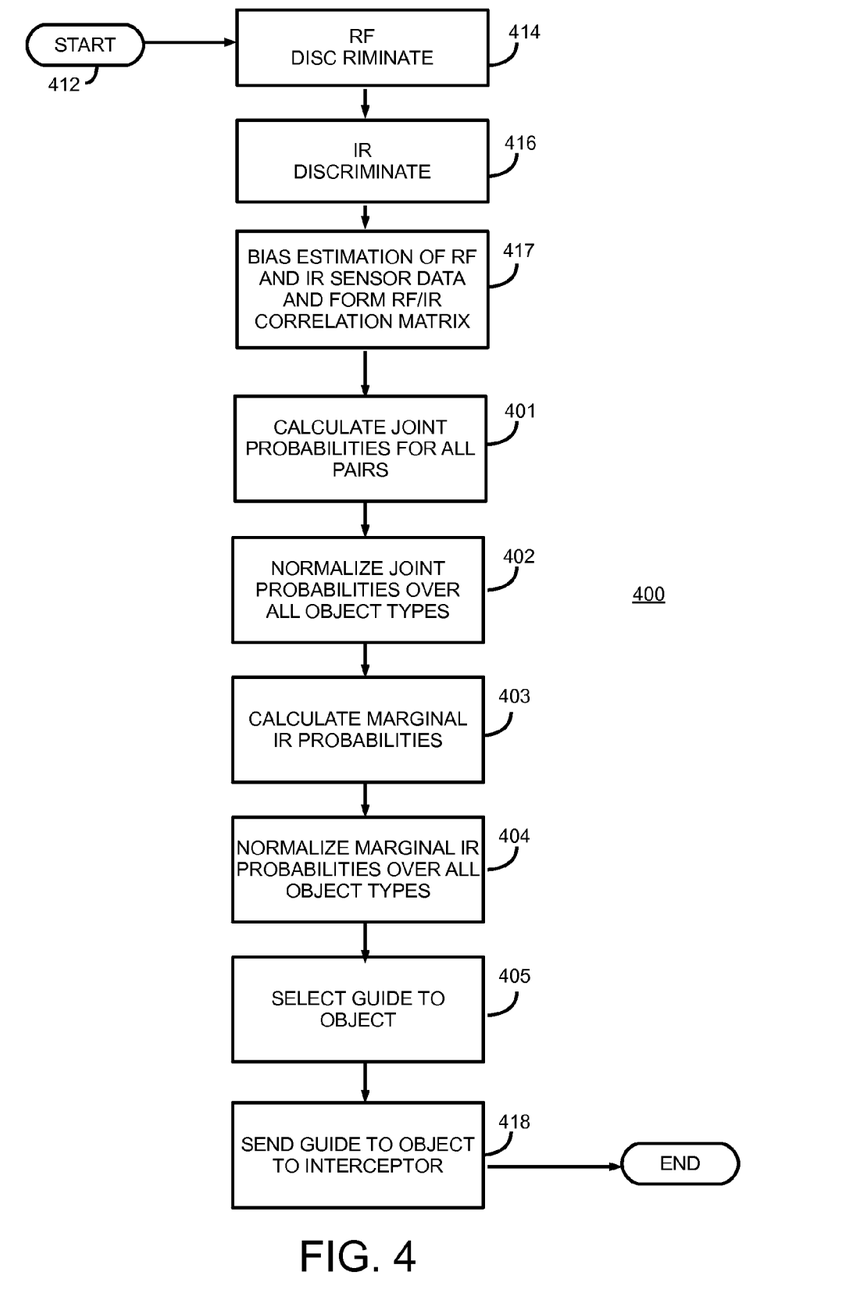
FIG. 4 is a process flow illustrating processing steps according to an aspect of the disclosure.

By way of non-limiting example only, FIG. 4 illustrates a logic or command flow chart or diagram 400 illustrating processing associated with aspects of the disclosure. In FIG. 4, the logic 400 starts at a START block 412, and flows to a block 414. Block 414 of FIG. 4 represents the RF discrimination of RF object track data performed in block 36 of FIG. 1 resulting in an RF probability matrix. From logic block 414, the logic 400 of FIG. 4 flows to a logic block 416. Logic block 416 represents the optical or IR discrimination of IR object track data performed in block 32 of FIG. 1 resulting in am IR probability matrix. Block 417 represents the forming of an RF/IR correlation matrix as described herein, where state bias estimates are determined in order to compensate for noise and angular error measurements associated with the RF and IR sensor measurement data. The RF/IR correlation is based on the RF and IR object track data, and a multi-step process of combining RF and IR probabilities and correlation inputs in order to select the guide-to object (the object of interest in the cloud) as described in U.S. Pat. No. 8,378,880, the subject matter thereof incorporate by reference herein in its entirety, and may be utilized in conjunction with the bias estimation and correlation processing described herein. The processing may be performed in block 38 of FIG. 1 and is also illustrated by blocks 401 through 405 in the logic or command flow diagram or chart 400 of FIG. 4. First, the probabilities and correlations are applied to logic block 401 and are used to calculate joint probability matrices for all object pairs, one for each object type, as suggested by block 401 of FIG. 4. This results in a matrix set of joint probabilities. These joint probabilities are applied to a logic block 402, representing the normalization over all object types. The normalized joint probabilities are passed, by a logic path to a further logic block 403. In this step, represented by logic block 403 of FIG. 4, the marginal probabilities for each IR object are calculated. The logic 400 flows by path to a further block 404, where these probabilities are once again normalized. Block 405 of logic 400 receives the twice-normalized marginal probabilities by way of a logic path. Finally, the IR object with the highest probability of being the object type of interest is selected as the guide-to object, as suggested by logic block 405 of FIG. 4. The last significant step of logic flow 400 of FIG. 4 is to identify the guide-to object to the guidance/navigation module of block 44 of FIG. 1, as suggested by block 418 of FIG. 4.

Thus, there has been shown a correlation estimation and reporting method for selecting an object of interest in a cloud of objects of lesser interest that comprises: obtaining positional data from RF and IR sensors; processing the positional data to generate a dimensional representation in a common reference frame; combining the RF and IR measurements to determine translational bias and angular misalignment errors associated with the RF and IR measurements; defining a weighted distance metric based on sensor measurement uncertainties; determining bias estimates based on the distance metric; and determining correlation components for each combination of RF and IR objects using the determined bias estimates for generating RF/IR correlation matrix data for input to an object selection process.

The correlation system and method as disclosed herein may also receive at its input (block 34 of FIG. 1) range estimation data in terms of 3D target states and 3D covariance data based on the IR and RF data provided in FIG. 1, in accordance with the processing shown and described in co-pending U.S. patent application Ser. No. 13/803,907 entitled "PASSIVE RANGE ESTIMATING ENGAGEMENT SYSTEM AND METHOD", filed on Mar. 14, 2013, the subject matter thereof incorporated herein by reference in its entirety. As shown therein, 3-dimensional states of objects travelling in a ballistic manner within an IR sensor FOV using 2-dimensional sensor angular measurements may be used to provide improved inputs to the RF/IR correlation module 34. The range derived provides an extra dimension of object separation in the RF/IR correlation algorithm, resulting in improved object selection, higher probability for engagement success, mitigation of the effects of challenging intercept geometries and improved guidance and navigation of the intercepting missile.

Although this invention has been described with reference to particular embodiments, it is to be understood that the embodiments and variations shown and described herein are for illustration purposes only. Modifications to the current design may be implemented by those skilled in the art, without departing from the scope of the invention. Further, any of the functions and steps provided herein may be implemented in hardware, software or a combination of both and may reside on one or more processing devices located at any location of a configuration linking the elements of FIG. 1.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

The invention claimed is:

1. A method for selecting an object of interest in a cloud of objects of lesser interest comprising:
   obtaining object positional data from at least one RF sensor and at least one IR sensor;
   processing, by a processor of an electromagnetic/optical correlator, the positional data to generate a dimensional representation in a common reference frame;
   combining, by said electromagnetic/optical correlator processor, the RF and IR positional data to determine translational bias and angular misalignment errors associated with the RF and IR positional data;
   defining, by said electromagnetic/optical correlator processor, a weighted distance metric based on sensor measurement uncertainties;
   determining, by said correlation processor, bias estimates based on the distance metric; and
   determining, by said electromagnetic/optical correlator processor, correlation components for each combination of RF and IR objects using the determined bias estimates for generating RF/IR correlation matrix data for input to an object selection process.

2. The method of claim 1, wherein the step of processing the positional data to generate a dimensional representation in a common reference frame comprises projecting the RF sensor data onto the IR sensor line of sight (LOS) coordinate frame.

3. The method of claim 1, wherein the step of combining the RF and IR measurements to determine translational bias and angular misalignment errors comprises determining the difference between the RF and IR positional data to obtain measurement errors.

4. The method of claim 3, further comprising subtracting the bias estimates from the obtained measurement errors.

5. The method of claim 4, further comprising determining state estimates associated with radar bias and IR rotational misalignment estimates according to the weighted distance metric.

6. The method of claim 5, wherein the weighted distance metric is:

$$|d|^2 = \vec{\epsilon}^T W^{-1} \vec{\epsilon} + \hat{\beta}^T R^{-1} \hat{\beta} + \hat{\Gamma}^T V^{-1} \hat{\Gamma}$$

wherein W, R and V are weight matrices representative of the measurement noise covariance, radar bias covariance and the IR sensor rotational misalignment covariance.

7. A system for identifying an object of interest in a cloud of remote objects of different types, where the number of object types is no greater than X, said system comprising:
   an RF sensor observing said cloud, and configured to generate RF signals representing RF tracked object data for at least some of the objects of said cloud;
   an electromagnetic discriminator including a computer processor coupled to said RF sensor and configured to compute the probability of each RF tracked object being one of the X possible object types;
   an optical sensor observing at least portions of said cloud, and configured to generate infrared (IR) optical signals representing IR tracked object data for at least some objects of said cloud;
   an optical discriminator including a computer processor configured to compute the probability of each IR tracked object being one of the X possible object types;
   an electromagnetic/optical correlator configured to determine the probability that the ith electromagnetic object is correlated or matched with the jth optical object, the correlator including a computer processor configured to:
      generate an electromagnetic/optical correlation matrix by processing RF and IR positional data to generate a dimensional representation in a common reference frame;
      combine RF and IR measurements to determine translational bias and angular misalignment errors associated with the RF and IR measurements;
      define a weighted distance metric based on sensor measurement uncertainties; determining bias estimates based on the distance metric; and
      determine correlation components for each combination of RF and IR objects using the determined bias estimates for generating RF/IR correlation matrix data for input to an object selection process.

8. The system of claim 7, wherein said electromagnetic/optical correlator is further configured to determine the probability of correlation pairing according to a maximum likelihood criteria.

9. The system of claim 8, wherein said electromagnetic/optical correlator is further configured to combine the RF and IR measurements to determine translational bias and angular misalignment errors by determining the difference between the RF and IR measurements to obtain measurement errors.

10. The system of claim 7, wherein said electromagnetic/optical correlator is further configured to generate a dimensional representation in a line of sight (LOS) reference frame by projecting the RF sensor data onto the IR sensor LOS coordinate frame.

11. The system of claim 7, wherein said electromagnetic/optical correlator is further configured to subtract the bias estimates from the obtained measurement errors.

12. Apparatus for providing correlation data for object selection and target intercept comprising:
   a data storage device storing object positional data from at least one RF sensor and at least one IR sensor measurements;
   one or more computer processors in communication with the data storage device including an electromagnetic/optical correlator processor; and
   a program memory, coupled to the one or more computer processors, storing on a non-transitory computer-readable medium program instruction steps for execution by the one or more computer processors, the program instructions, when executed by the one or more computer processors, causing the one or more computer processors to:
      process the positional data by said electromagnetic/optical correlator processor to generate a dimensional representation in a common reference frame;
      combine in said electromagnetic/optical correlator processor, the RF and IR measurements to determine translational bias and angular misalignment errors associated with the RF and IR measurements;
      define in said electromagnetic/optical correlator processor, a weighted distance metric based on sensor measurement uncertainties;
      determine in said electromagnetic/optical correlator processor, bias estimates based on the distance metric; and
      determine in said electromagnetic/optical correlator processor correlation components for each combination of RF and IR objects using the determined bias estimates for generating RF/IR correlation matrix data for input to an object selection process.

13. The apparatus of claim 12, wherein the program instructions, when executed by the electromagnetic/optical correlator processor, further cause the one or more computer processors to:
generate a dimensional representation in a common reference frame that comprises projecting the RF sensor data onto the IR sensor LOS coordinate frame.

14. The apparatus of claim 12, wherein the program instructions, when executed by the electromagnetic/optical correlator processor, further cause the electromagnetic/optical correlator processor to combine the RF and IR measurements to determine translational bias and angular misalignment errors by determining the difference between the RF and IR measurements to obtain measurement errors.

15. The apparatus of claim 12, wherein the program instructions, when executed by electromagnetic/optical correlator processor, further cause the electromagnetic/optical correlator processor to subtract the bias estimates from the obtained measurement errors.

16. The apparatus of claim 15, wherein the program instructions, when executed by the electromagnetic/optical correlator processor, further cause the electromagnetic/optical correlator processor to determine state estimates associated with radar bias and IR rotational misalignment estimates according to the weighted distance metric.

17. The apparatus of claim 16, wherein the weighted distance metric is:

$$|d|^2 = \vec{\epsilon}^T W^{-1} \vec{\epsilon} + \hat{\beta}^T R^{-1} \hat{\beta} + \hat{\Gamma}^T V^{-1} \hat{\Gamma}$$

wherein W, R and V are weight matrices representative of the measurement noise covariance, radar bias covariance and the IR sensor rotational misalignment covariance.

* * * * *